US012490864B2

(12) United States Patent
Gogel et al.

(10) Patent No.: US 12,490,864 B2
(45) Date of Patent: Dec. 9, 2025

(54) COMBINATION PRESSURE AND OPEN FRYING APPARATUS

(71) Applicant: Henny Penny Corporation, Eaton, OH (US)

(72) Inventors: Mark Gogel, Fairborn, OH (US); Matthew Johnson, Clayton, OH (US); Adrian Jason Pereira, Dayton, OH (US); Robert Wood, Vandalia, OH (US); Wendell Murray, Somerville, OH (US)

(73) Assignee: Henny Penny Corporation, Eaton, OH (US)

( * ) Notice: Subject to any disclaimer, the term of this patent is extended or adjusted under 35 U.S.C. 154(b) by 899 days.

(21) Appl. No.: 17/771,698

(22) PCT Filed: Oct. 30, 2020

(86) PCT No.: PCT/US2020/058103
§ 371 (c)(1),
(2) Date: Apr. 25, 2022

(87) PCT Pub. No.: WO2021/096701
PCT Pub. Date: May 20, 2021

(65) Prior Publication Data
US 2022/0361715 A1 Nov. 17, 2022

Related U.S. Application Data

(60) Provisional application No. 62/934,203, filed on Nov. 12, 2019.

(51) Int. Cl.
*A47J 37/12* (2006.01)
*A47J 27/08* (2006.01)

(52) U.S. Cl.
CPC ......... *A47J 37/128* (2013.01); *A47J 27/0817* (2013.01); *A47J 37/1223* (2013.01); *A47J 37/1266* (2013.01)

(58) Field of Classification Search
CPC .. A47J 37/128; A47J 37/1223; A47J 37/1266; A47J 27/0817; A47J 27/08;
(Continued)

(56) References Cited

U.S. PATENT DOCUMENTS 2,592,627 A * 4/1952 Ward .................. A47J 27/0813
292/7
4,273,991 A * 6/1981 Barnhill .............. A47J 27/0817
126/369

(Continued)

FOREIGN PATENT DOCUMENTS

| JP | 2016063930 A | 4/2016 |
| WO | 2017127655 A1 | 7/2017 |
| WO | 2017161219 A1 | 9/2017 |

OTHER PUBLICATIONS

International Searching Authority, Search Report and Written Opinion issued in PCT/US2020/058103, mailed Feb. 9, 2021 (14 pages).

*Primary Examiner* — Steven W Crabb
*Assistant Examiner* — Allison E Helferty
(74) *Attorney, Agent, or Firm* — Wood Herron & Evans LLP

(57) ABSTRACT

A combination pressure and open frying apparatus includes at least one selectively closeable frypot and a cover configured to selectively close the frypot. The selectively closeable frypot is configured to operate as a pressure frying platform when the cover is closed and configured to operate as an open frying platform when the cover is open. The apparatus includes a clamping mechanism with a spindle that includes a shaft and a handle that is configured to be selectively mounted to the shaft in a plurality of positions relative to the (Continued)

shaft. The apparatus may also include at least one second frypot that can operate at least as an open frying platform, with a common filtration system for the frypots having a selector valve and a failsafe valve, which prevents flow of cooking medium into at least one selectively closeable frypot when the selectively closeable frypot is pressurized.

12 Claims, 5 Drawing Sheets

(58) Field of Classification Search
CPC ............... A47J 27/0811; A47J 27/0804; A47J 27/0815; A47J 36/06; A47J 36/10; F16J 13/22; F16J 13/18; F16J 13/16; F16J 13/20; F17D 3/00; F17D 1/00; B65D 45/00; B65D 45/325; B65D 45/30; B65D 45/10; B65D 45/28; B01J 3/03
See application file for complete search history.

(56) References Cited

U.S. PATENT DOCUMENTS

| | | |
|---|---|---|
| 4,325,491 A | 4/1982 | Barnhill |
| 4,498,695 A | 2/1985 | Pardo |
| 2016/0033463 A1 | 2/2016 | Robertson et al. |
| 2018/0084948 A1* | 3/2018 | Eros .................. A47J 37/12 |

* cited by examiner

COMBINATION PRESSURE AND OPEN FRYING APPARATUS

CROSS REFERENCE TO RELATED APPLICATION

This application is a national phase application of, and claims priority to, International Patent Application No. PCT/US2020/058103, filed on Oct. 30, 2020, which claims the benefit of U.S. Provisional Patent Application Ser. No. 62/934,203, filed Nov. 12, 2019, the disclosures of which are incorporated by reference herein in their entireties.

TECHNICAL FIELD

The invention generally relates to fryers and, more particularly, to systems and methods for improving safe and reliable performance of pressure frypots in combination pressure and open fryers.

BACKGROUND

Oil-based frying is commonly used as a cooking method for a wide range of food, such as poultry, fish, potato products, and the like. Commercial fryers include one or more fry pots that are filled with a cooking medium such as oil or solid fats. Heat is provided to the cooking medium using a heater, which typically includes an electrical heating element submerged in the cooking medium or a gas burner thermally coupled to the cooking medium through the walls of the fry pot. Combination pressure and open fryers, such as those described in U.S. Patent Application Publication No. 2018/0084948, which is incorporated by reference in its entirety, may have a varied configuration of open and selectively closeable cooking chambers or frypots, or may have a single frypot that is selectively closeable to be used as either an open frying platform or a pressure frying platform depending on the food product and desired cooking result. In open frying applications, when the cooking medium reaches a preset cooking temperature, food products may be placed into the cooking medium for a predetermined amount of time during which the food products are cooked by heat from the cooking medium. To facilitate insertion and removal of the food product, the food product is typically placed inside a container, such as a wire basket, and the container is lowered into the cooking medium for the predetermined amount of time.

In pressure frying applications, a cover or lid is movable from an open position to a closed position that seals the frypot and a heating element that heats the cooking medium within the frypot to a desired cooking temperature. The amount of time sufficient to cook the food product within the frypot at a given cooking temperature may depend on the type and amount of food product that is being cooked in the cooking chamber. When the food product is submerged in the hot cooking medium, the food product begins to cook and release steam, which pressurizes the cooking chamber. The increased pressure in the cooking chamber reduces the cooking time and helps prevent the food product from drying out, in an optimum pressure cooking cycle. More particularly, the boiling point of water increases due to the elevated conditions thereby allowing the food product to retain more moisture while being cooked.

In such pressure frying applications, a clamping mechanism having a clamping surface may be provided for urging the cover toward the closed position. For example, a spindle may be rotatably coupled to the cover and configured to move the clamping surface from an unclamped position to a clamped position that clamps the cover in the closed position. Conventional spindles include a rotatable shaft and a handle permanently mounted to the shaft in a fixed position relative to the shaft. When the cover is in a partially closed or intermediate position, the handle of the spindle may be rotated (e.g., in a clockwise direction) relative to the cover from a start orientation toward a predetermined stop orientation to position the shaft in a desired clamping orientation to urge the cover into the fully closed position. The predetermined stop orientation may be selected such that a portion of the handle, such as a lever portion and/or knob thereof, is in a particular location when the cover is clamped in the closed position. For example, it may be desirable for a lever portion of the handle to be aligned with a reference point on the fryer when the cover is clamped in the closed position to provide a consistent and reliable visual indication of the clamped status of the cover and/or to assist an operator in rotating the handle to the proper orientation for clamping the cover. In some cases, one or more hard stops may be configured to limit rotation of the handle, such as to prevent further rotation of the handle (e.g., in the clockwise direction) beyond the predetermined stop orientation.

However, the actual clamping orientation of the shaft for achieving a firm clamping of the cover in the closed position may deviate from the desired clamping orientation during the lifetime of the fryer. For example, one or more gaskets between the cover and the frypot may gradually wear or otherwise degrade over time, such that rotating the handle to the predetermined stop orientation may be insufficient to firmly clamp the cover in the closed position (e.g., the cover may remain in a partially closed or intermediate position). As a result, the shaft of the spindle may need to be rotated beyond the desired clamping orientation to an actual clamping orientation whereat the cover may be firmly clamped in the closed position. Thus, the alignment of a portion of the handle with the reference point on the fryer may no longer be a reliable indication of the clamped status of the cover. In some cases, the operator may continue to rotate the handle to the predetermined stop orientation thereby positioning the shaft in the desired clamping orientation without realizing that the cover is only partially clamped and that further rotation of the shaft is required to firmly clamp the cover in the closed position. Moreover, further rotation of the handle may be inhibited by the one or more hard stops configured to limit rotation of the handle such that firmly clamping the cover in the closed position may be impossible without replacing the worn gasket.

In addition, combination pressure and open fryers having a varied configuration of open and selectively closeable frypots typically include a common oil filtration system for circulating oil or any other cooking medium to and from the various frypots. For example, a selector valve may be configured to selectively provide oil to the open and selectively closeable frypots. However, failure of the selector valve during a pressure cooking cycle could cause oil from an open frypot to be re-directed to the pressure frypot while the cover is clamped in the closed position and the pressure frypot is pressurized. As a result, such oil may inadvertently and undesirably escape through the steam release of the pressure frypot.

Thus, it would be desirable to provide a combination pressure and open fryer capable of performing with improved safety and reliability.

SUMMARY

To improve the safety and reliability of such fryers and overcome the technical issues identified above, a pressure frying apparatus is provided in some embodiments. The pressure frying apparatus includes at least one selectively closeable frypot configured to cook food product, which includes an access opening for food product. The apparatus also includes a cover configured to selectively close the access opening and seal the selectively closeable frypot. The cover moves from a closed position to an open position. The selectively closeable frypot is configured to operate at a pressure frying platform when the cover is in the closed position and is configured to operate as an open frying platform when the cover is in the open position. The pressure frying apparatus also includes a clamping mechanism including at least one clamping surface configured to urge the cover toward the closed position and a spindle rotatably coupled to the cover and configured to move the at least one clamping surface from an unclamped position to a clamped position that clamps the cover in the closed position. The spindle includes a shaft and a handle selectively mounted to the shaft. The handle is configured to be selectively mounted to the shaft in a plurality of positions relative to the shaft. Advantageously, this mounting of the handle to the shaft allows for adjustments to be made to account for gasket deterioration and other alignment changes that may occur over the life of the fryer, thereby to allow for a proper pressure seal to be made without necessitating replacement of the entire assembly.

In one embodiment, the handle includes first and second lever portions extending away from each other. The handle may include an adjustment portion positioned between the first and second lever portions. The adjustment portion includes a plurality of mounting bores configured to selectively receive one or more fasteners for selectively mounting the handle to the shaft. Such mounting bores may be circumferentially arranged on the adjustment portion, for example. The one or more fasteners includes a pair of fasteners, and the shaft includes a pair of bores configured for alignment with a selected pair of the mounting bores of the adjustment portion, thereby to receive the pair of fasteners for mounting the handle to the shaft.

In another embodiment, the pressure frying apparatus includes a first cooking medium inlet for the selectively closeable frypot, and at least one second frypot configured to cook food product. The second frypot is configured to operate in at least one operating state as an open frying platform, and this second frypot includes a second cooking medium inlet. A common filtration system is operatively connected to the second frypot and the selectively closeable frypot, this filtration system being configured to filter cooking medium from each of the at least one second frypot and the at least one selectively closeable frypot. The common filtration system includes a pump, a selector valve that is in-line with and downstream from the pump and upstream from the first and second cooking medium inlets, and a failsafe valve that is in-line with and downstream from the selector valve and upstream from the first cooking medium inlet. The failsafe valve includes an inlet end and an outlet end. The selector valve is configured to selectively place the pump into and out of fluid communication with the second cooking medium inlet and the inlet end of the failsafe valve. The failsafe valve is configured to selectively place the first cooking medium inlet into and out of fluid communication with the inlet end of the failsafe valve to prevent flow of cooking medium into at least one selectively closeable frypot when that frypot is pressurized. Thus, the common filtration system avoids having oil recirculation flow back into a pressurized pot, which could cause unintentional oil discharge from the fryer, while also avoiding pressure head that could damage the pump.

In other embodiments according to the invention, a method is provided for adjusting a spindle rotatably coupled to a cover of a selectively closeable frypot configured to cook food product. The spindle is configured to move a clamping surface from an unclamped position to a clamped position that clamps the cover in a closed position. The spindle includes a shaft and a handle selectively mounted to the shaft in a first position relative to the shaft. The method includes selectively mounting the handle to the shaft in a second position relative to the shaft different than the first position.

In one embodiment, the method also includes selectively removing the handle from the shaft prior to selectively mounting the handle to the shaft in the second position. Selectively removing the handle may include removing fasteners from a first set of mounting bores provided in an adjustment portion of the handle. Selectively mounting the handle to the shaft in the second position includes positioning the fasteners in a second set of mounting bores provided in the adjustment portion different from the first set of mounting bores.

In further embodiments according to the invention, a combination pressure an open frying apparatus is provided. The frying apparatus includes at least one selectively closeable frypot configured to cook food product and including an access opening for food product and a first cooking medium inlet. The frying apparatus also includes at least one second frypot configured to cook food product, the second frypot configured to operate in at least one operating state as an open frying platform and including a second cooking medium inlet. A cover is configured to selectively close the access opening and seal the selectively closeable frypot, the cover moveable from an open position to a closed position. The selectively closeable frypot is configured to operate at a pressure frying platform when the cover is in the closed position and is configured to operate as an open frying platform when the cover is in the open position. The pressure frying apparatus also includes a common filtration system that is operatively connected to the second frypot and the selectively closeable frypot, this filtration system being configured to filter cooking medium from each of the at least one second frypot and the at least one selectively closeable frypot. The common filtration system includes a pump, a selector valve that is in-line with and downstream from the pump and upstream from the first and second cooking medium inlets, and a failsafe valve that is in-line with and downstream from the selector valve and upstream from the first cooking medium inlet. The failsafe valve includes an inlet end and an outlet end. The selector valve is configured to selectively place the pump into and out of fluid communication with the second cooking medium inlet and the inlet end of the failsafe valve. The failsafe valve is configured to selectively place the first cooking medium inlet into and out of fluid communication with the inlet end of the failsafe valve to prevent flow of cooking medium into at least one selectively closeable frypot when that frypot is pressurized.

In one embodiment, the failsafe valve includes a ball valve.

In another embodiment, the frying apparatus further includes a controller in operative communication with the selector valve and the failsafe valve. The controller is configured to send contemporaneous open signals to the selector valve and the failsafe valve to selectively place the pump into fluid communication with the first cooking medium inlet. The controller is configured to send contemporaneous close signals to the selector valve and the failsafe valve to selectively place the pump out of fluid communication with the first cooking medium inlet.

In yet another embodiment, the failsafe valve is configured to prevent cooking medium from entering the selectively closeable frypot during a failure of the selector valve.

In a further embodiment, the frying apparatus also includes a multi-port manifold having an inlet end that is in-line with and downstream from the pump, a first outlet end that is in-line with and upstream from the selector valve, and a second outlet end that is in-line with and upstream from a check valve. The check valve is configured to limited pressure within the filtration system.

In another embodiment, the second frypot is an open frypot configured to operate solely as an open frying platform. Alternatively, the second frypot may include a second cover that is configured to selectively close an access opening into the second frypot and be moveable between a closed position and an open position to allow the second frypot to operate selectively as an open frying platform and as a pressure frying platform.

It will be understood that the various embodiments described may be combined in any combination to achieve each of the technical benefits and functionalities described. Furthermore, the common filtration system may be provided with reconfigured or duplicated valves so as to protect from recirculation to any number of pressurized pots when more than one of (or all of) the frypots in the fryer has a cover and operates as a pressure frying platform.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
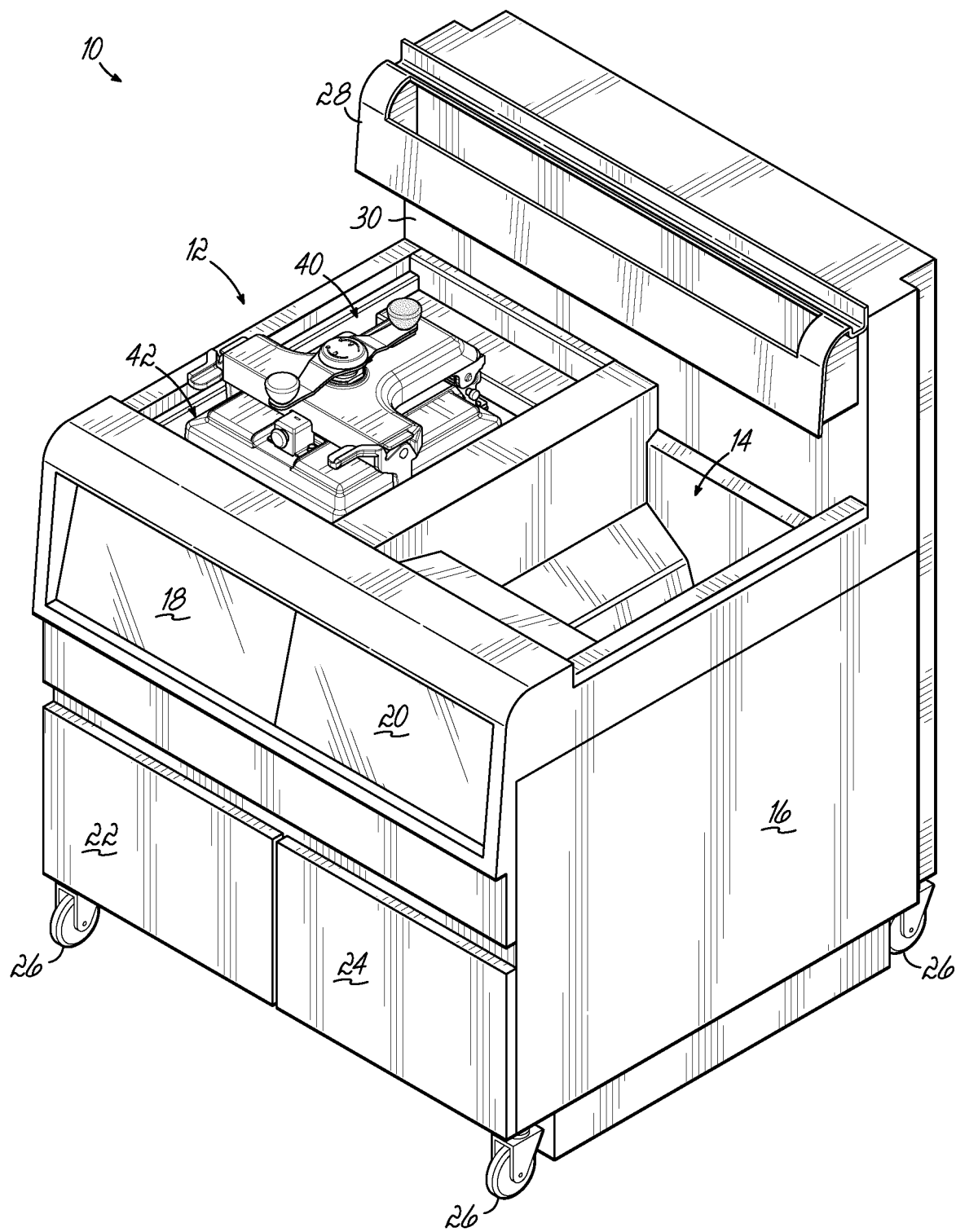
FIG. 1 is a perspective view of a combination pressure and open frying apparatus or fryer according to an embodiment of the invention.

With reference to FIG. 1, a combination pressure and open frying apparatus or fryer 10 is shown in accordance with an embodiment of the invention. The fryer 10 includes a selectively closeable frypot 12, an open frypot 14 (also referred to as a second frypot), a cabinet 16, control panels 18, 20, access panels 22, 24, wheels 26, a basket hanger 28, and a backsplash 30. Each of the fry pots 12, 14, cabinet 16, access panels 22, 24, basket hanger 28, and backsplash 30 may be constructed from stainless steel, mild steel, or some other suitable material. The open frypot 14 is configured to operate as an open frying platform, while the selectively closeable frypot 12 is configured to selectively operate as a pressure frying platform or as an open frying platform. As set forth in further detail below, the fryer 10 may provide improved safety and reliability. For example, pressure cooking cycles may be performed in the selectively closeable frypot 12 with increased likelihood that the selectively closeable frypot 12 is and remains fully closed and is not undesirably receiving additional cooking medium, such as from the open frypot 14. The features of the fryer 10 are set forth in further detail below to clarify each of these functional advantages and other benefits provided in this disclosure.

In the embodiment shown, the selectively closeable frypot 12 includes an access opening (not shown) for allowing uncooked food product to be deposited into the frypot 12 and for allowing cooked food product to be removed from the frypot 12. The fryer 10 includes a closure assembly 40 having a lid or cover 42 configured to selectively close the access opening and seal the selectively closeable frypot 12. In this regard, the cover 42 may be movable between at least one open position (not shown) wherein food product may be deposited into or removed from the frypot 12, a partially closed position wherein the cover 42 closes the access opening and is prevented from moving toward the open position, and a fully closed or sealed position wherein the cover 42 closes the access opening and forms a pressure-tight seal with the frypot 12. In one embodiment, one or more gaskets (not shown) may be positioned between the cover 42 and the selectively closeable frypot 12, such as along a periphery thereof, to assist in forming a pressure-tight seal between the cover 42 and the frypot 12 when the cover 42 is in the fully closed position. While the fryer 10 is shown with an open frypot 14 in the embodiment shown in FIG. 1, and this open frypot 14 does not include a closure assembly 40, it will be understood that another closure assembly 40 may be provided at this second frypot in other embodiments of the fryer 10 to make the second frypot another selectively closeable and openable frypot.

Figure 2:
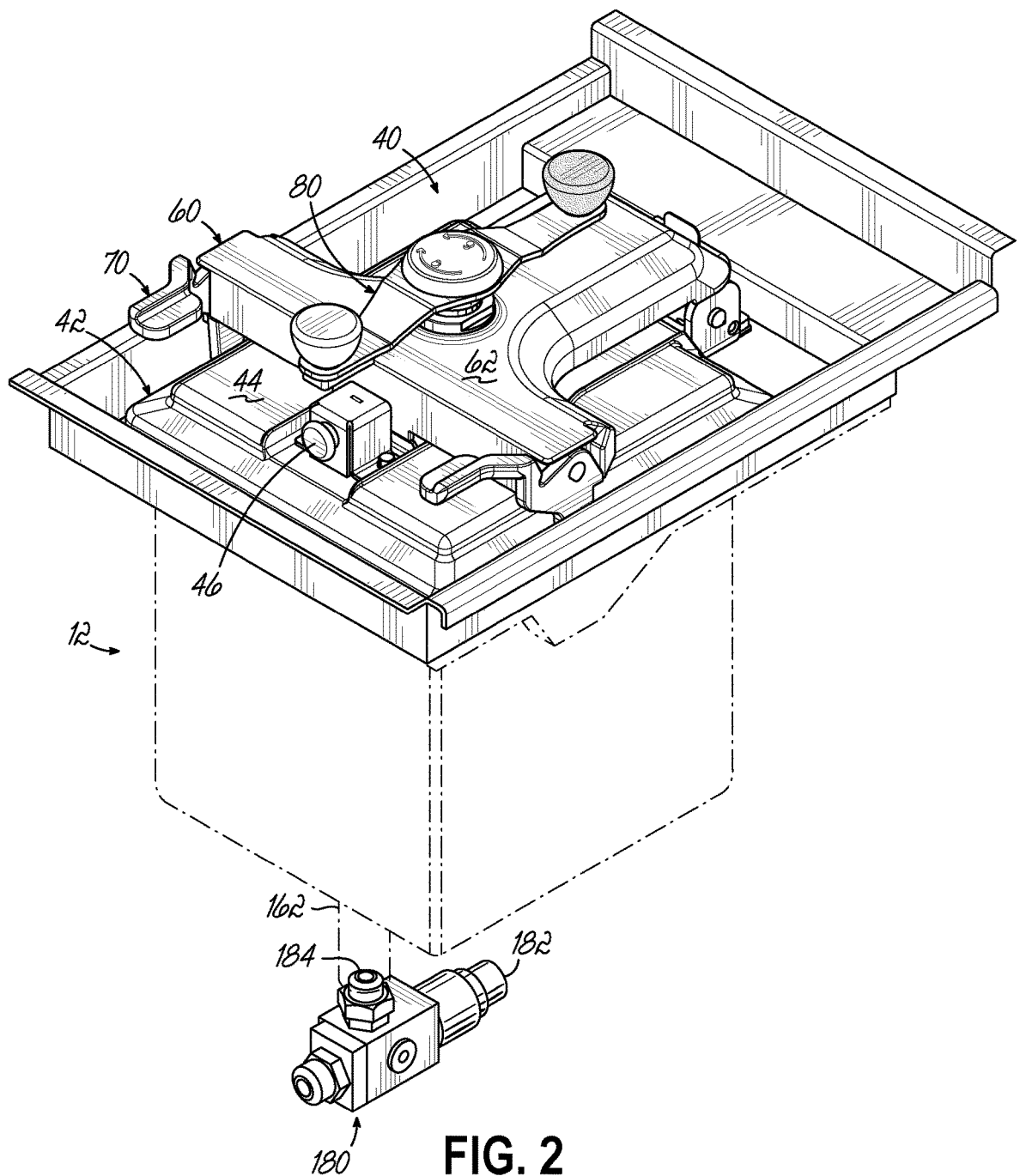
FIG. 2 is a perspective view of a closure assembly positioned over a selectively closeable frypot of the fryer of FIG. 1 and of a failsafe valve upstream from a cooking medium inlet of the selectively closeable frypot.
Figure 3:
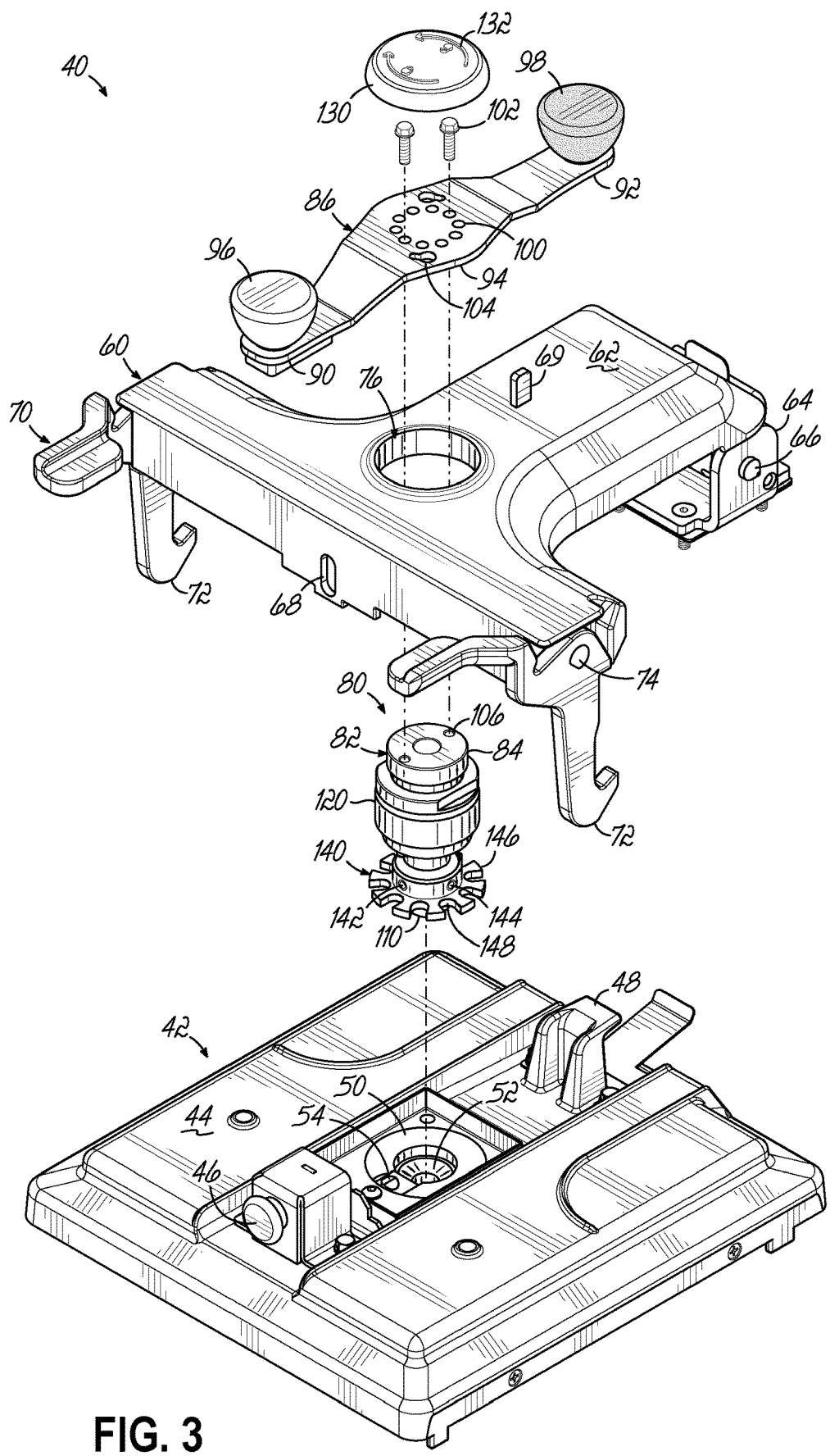
FIG. 3 is an exploded view of the closure assembly of FIG. 2.

Referring now to FIGS. 2 and 3, with continuing reference to FIG. 1, the illustrated cover 42 includes a generally rectangular body 44, a spring-loaded plunger 46 positioned at or near a front end of the body 44, and a catch 48 positioned at or near a rear end of the body 44. The illustrated cover 42 also includes a generally central recess 50 provided in an upper surface of the body 44 and including a nest 52, the purposes of which are described below. As shown, the cover 42 further includes a pin 54 positioned adjacent to the recess 50 and/or nest 52, the pin 54 being vertically extendable from and retractable into the body 44. For example, the pin 54 may be operatively coupled to a pressure plate (not shown) configured to extend the pin 54 vertically from the body 44 when the frypot 12 is pressurized and to retract the pin 54 vertically into the body 44 when the frypot 12 is not pressurized. In addition or alternatively, the pin 54 may be spring-loaded in order to be biased toward a vertically retracted position.

In the embodiment shown, the closure assembly 40 of the fryer 10 includes an auxiliary closure member 60 configured to assist in transitioning the cover 42 between the open and closed positions and further configured to assist in selectively securing the cover 42 in the partially and/or fully closed position(s). The illustrated auxiliary closure member 60 includes a generally T-shaped pivotable brace 62 hingedly coupled to the frypot 12 via a pivot block 64 and at least one corresponding pivot pin 66. The pivotable brace 62 is arranged at least partially over the cover 42 and may be configured to carry the cover 42 between the open and closed positions. In this regard, the brace 62 includes an elongate slot 68 along a front face thereof for selectively receiving an end of the spring-loaded plunger 46 of the cover 42, and may include a ledge or other mechanical features (not shown) to engage the catch 48 of the cover 42, such that pivoting of the brace 62 about the pivot pin(s) 66 may effect movement of the cover 42 between the open and closed positions. In the embodiment shown, a first hard stop 69 is provided on an upper surface of the brace 62 for reasons described below.

The auxiliary closure member 60 further includes a locking mechanism 70 configured to selectively secure the cover 42 in the partially and/or fully closed position(s). The illustrated locking mechanism 70 includes a pair of hooks 72 fixedly coupled to opposite ends of a transversely-extending stem 74 rotatable within the brace 62 of the auxiliary closure member 60, such that the hooks 72 may be arranged at opposite terminal sides of the brace 62 and may be laterally outward relative to the corresponding sides of the cover 42. In this manner, the hooks 72 may be synchronously rotated relative to the brace 62 into and out of mechanical engagement with corresponding posts or other mechanical features (not shown) fixed relative to the frypot 12 for selectively securing the brace 62 against the frypot 12 with the cover 42 sandwiched therebetween, thereby securing the cover 42 in the partially and/or fully closed position(s) such that the cover 42 may not inadvertently move toward the open position. The illustrated brace 62 also includes a bore 76 extending through a generally central portion thereof for alignment with the generally central recess 50 of the cover 42, the purpose of which is described below. For example, the bore 76 may be positioned relatively proximal to the locking mechanism 70 and may be positioned relatively distal from the pivot block 64 and associated pivot pin(s) 66.

In the embodiment shown, the closure assembly 40 also includes a clamping mechanism 80 configured to selectively urge the cover 42 toward the fully closed position. The illustrated clamping mechanism 80 includes a spindle 82 rotatably coupled to the brace 62 of the auxiliary closure member 60, the spindle 82 including a rotatable shaft 84 and a handle 86 selectively mounted to the shaft 84 such that the handle 86 may be configured to rotate therewith. In this regard, the handle 86 includes first and second lever portions 90, 92 extending away from each other, and an adjustment portion 94 positioned therebetween. First and second knobs 96, 98 are coupled to the first and second lever portions 90, 92, respectively, at or near terminal ends thereof for assisting an operator in gripping and/or manipulating the handle 86. In one embodiment, the knobs 96, 98 may include unique indicia or coloring to assist a user in visually distinguishing the knobs 96, 98 from each other. For example, the first knob 96 may be colored black while the second knob 98 may be colored red. In one embodiment, a second hard stop (not shown) may be provided on a bottom surface of one of the lever portions 90, 92, such as the first lever portion 90, for selectively abutting the first hard stop 69 provided on the upper surface of the brace 62 to thereby limit rotation of the spindle 82 relative to the brace 62.

In any event, the illustrated adjustment portion 94 of the handle 86 includes a plurality of mounting bores 100 for selectively receiving a pair of fasteners 102 (e.g., ¼-20 grade 8 screws) to selectively mount the handle 86 to the shaft 84, as described in greater detail below, and further includes a pair of slotted bores 104. In the embodiment shown, ten mounting bores 100 are circumferentially arranged on the adjustment portion 94 in five opposing pairs. In other embodiments, any suitable number of mounting bores 100 may be arranged on the adjustment portion 94 of the handle 86 in any suitable manner or pattern to provide the desired amount of adjustability of the handle 86 relative to the shaft 84. While not shown, the spindle 82 may further include a spacer disc selectively positioned between the shaft 84 and the adjustment portion 94 of the handle 86, and having a plurality of bores corresponding to the mounting bores 100 of the adjustment portion 94.

The illustrated rotatable shaft includes a pair of threaded bores 106 provided in an upper end thereof configured for alignment with a selected pair of the mounting bores 100 of the adjustment portion 94 of the handle 86 and to selectively receive the pair of fasteners 102 for selectively mounting the handle 86 to the shaft 84 in a desired orientation of the handle 86 relative to the shaft 84. For example, a first opposing pair of the mounting bores 100 may provide a first orientation of the handle 86 relative to the shaft 84, while a second opposing pair of the mounting bores 100 may provide a second orientation of the handle 86 relative to the shaft 84, and so forth. In this manner, the selective mounting of the handle 86 to the shaft 84 via the pair of threaded bores 106 and the plurality of mounting bores 100 may allow the orientation of the handle 86 to be indexed to a desired degree relative to the shaft 84.

As shown, the rotatable shaft 84 extends through the generally central bore 76 of the brace 62 such that the upper end of the rotatable shaft 84 may be positioned above the brace 62 and the lower end of the rotatable shaft 84 may be positioned below the brace 62. The illustrated clamping mechanism 80 further includes a ball or ball bearing 110 operatively coupled to the shaft 84 at or near the lower end thereof. The ball bearing 110 includes a spherical clamping surface for selectively applying a clamping action to a portion of the cover 42, such as the nest 52 provided in the recess 50. For example, movement of the ball bearing 110 toward the nest 52 may cause the clamping surface to apply a clamping action on the nest 52 when the cover 42 is in the partially closed or intermediate position to urge the cover 42 toward the fully closed position, while movement of the ball bearing 110 away from the nest 52 may cause the clamping surface to release the clamping action on the nest 52 to allow the cover 42 to be moved toward the partially closed or intermediate position.

In this regard, the spindle 82 may be configured to effect movement of the ball bearing 110 and accompanying clamping surface toward and away from the nest 52. To that end, the illustrated rotatable shaft 84 is at least partially housed within a stationary housing 120 fixed against movement relative to the brace 62. The stationary housing 120 may include an internally threaded portion configured to threadably engage an externally threaded portion (not shown) of the rotatable shaft 84 to thereby convert rotational movement of the shaft 84 into linear (e.g., vertical) movement of the shaft 84. In this manner, rotation of the shaft 84 may effect linear movement of the ball bearing 110 and the clamping surface thereof toward or away from the nest 52. In one embodiment, clockwise rotation of the shaft 84 may effect linear movement of the ball bearing 110 toward the nest 52 to apply a clamping action thereon for urging the cover 42 from the intermediate position into the fully closed position, while counterclockwise rotation of the shaft 84 may effect linear movement of the ball bearing 110 away from the nest 52 to remove the clamping action therefrom for allowing the cover 42 to be moved away from the fully closed position into the intermediate position.

In the embodiment shown, a cap 130 having indicia 132 thereon is removably coupled to the handle 86 of the spindle 82 via the pair of slotted bores 104 provided in the adjustment portion 94 thereof to provide a visual indication to an operator of the proper direction to rotate the handle 86 to achieve a desired status of the clamping mechanism 80 relative to the cover 42. As shown, the cap 130 may also conceal the pair of fasteners 102 and the plurality of mounting bores 100 of the adjustment portion 94 of the handle 86 and restrict access thereto.

The illustrated clamping mechanism 80 also includes a gear 140 fixedly coupled to the rotatable shaft 84, such as via a spring pin 142 and/or one or more set screw(s) 144, at or near the lower end thereof such that the gear 140 may be configured to rotate therewith. As shown, the gear 140 includes a plurality of teeth 146 and recesses 148 between adjacent teeth 146. The recesses 148 are each configured to selectively receive the vertically extendable and retractable pin 54 of the cover 42 for selectively locking the shaft 84 against rotation relative to the cover 42, such as when the frypot 12 is pressurized, to prevent inadvertent rotation of the spindle 82 while the frypot 12 is pressurized which might otherwise allow the cover 42 to be moved away from the fully closed position.

In one embodiment, a sensor (not shown) may be configured to detect whether the pin 54 of the cover 42 is fully engaged with one of the recesses 148 of the gear 140. For example, such a sensor may include a Hall effect board fixedly mounted to the cover 42 adjacent to the pin 54 and one or more magnets attached to the pin 54 along with a spring. The Hall effect board may be configured to sense the vertical movement of the magnets attached to the pin 54 and thereby determine whether the pin 54 is engaged with one of the recesses 148 and thus whether the shaft 84 is locked against rotation relative to the cover 42. In response to detecting that the pin 54 is engaged with one of the recesses 148, the Hall effect board may send a signal to a controller 150 (FIG. 5) of the combination pressure and open fryer 10 indicating that the shaft 84 is locked against rotation relative to the cover 42, and the controller 150 may in turn proceed with pressurizing the selectively closeable frypot 12 to begin a pressure cooking cycle therein. In response to detecting that the pin 54 is not engaged with one of the recesses 148, the Hall effect board may send a signal to the controller 150 indicating that the shaft 84 is not locked against rotation relative to the cover 42, and the controller 150 may in turn remain in a standby mode so that the selectively closeable frypot 12 is not pressurized until the pin 54 has fully engaged with one of the recesses 148. In one embodiment, the gear 140 may include a lower hollow frustoconical portion (not shown) for at least partially housing the ball bearing 110 to operatively couple the ball bearing 110 to the shaft 84.

During use, the cover 42 may initially be in an open position to allow uncooked food product to be deposited into the frypot 12 through the access opening. The cover 42 may then be moved toward the partially closed or intermediate position, such as by pivoting the auxiliary closure member 60 about the pivot pin(s) 66. With the cover 42 in the partially closed or intermediate position, the hooks 72 of the locking mechanism 70 may be rotated into mechanical engagement with the corresponding posts or other mechanical features fixed relative to the frypot 12 to selectively secure the brace 62 of the auxiliary closure member 60 against the frypot 12 with the cover 42 sandwiched therebetween, thereby securing the cover 42 in the intermediate or partially closed position against inadvertent movement toward the open position. The handle 86 of the spindle 82 may be subsequently rotated (e.g., clockwise) to effect linear movement of the ball bearing 110 of the clamping mechanism 80 toward the nest 52 of the cover 42 to apply a clamping action thereon and thus urge the cover 42 into the fully closed position to provide a pressure-tight seal between the cover 42 and the frypot 12.

Figure 4A:
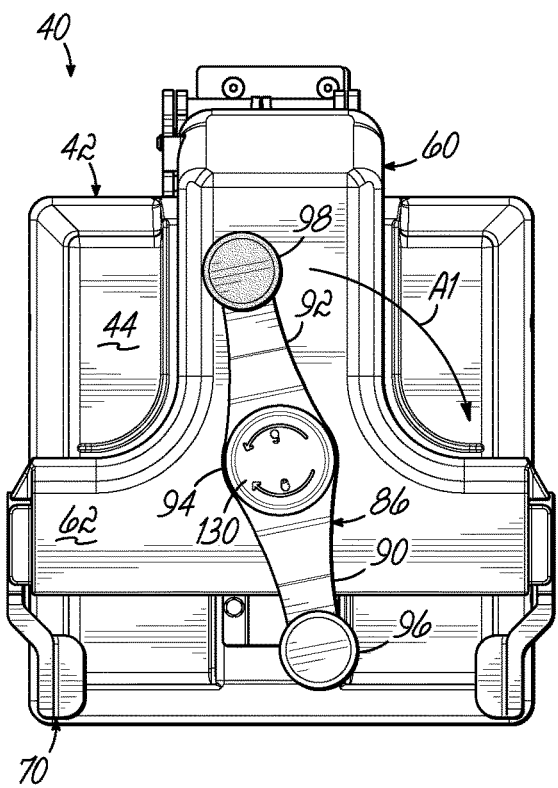
FIG. 4A is a top elevation view of the cover of FIG. 2, showing the handle of the spindle rotating in a clockwise direction from a start orientation toward a predetermined stop orientation to clamp the cover in a closed position.
Figure 4B:
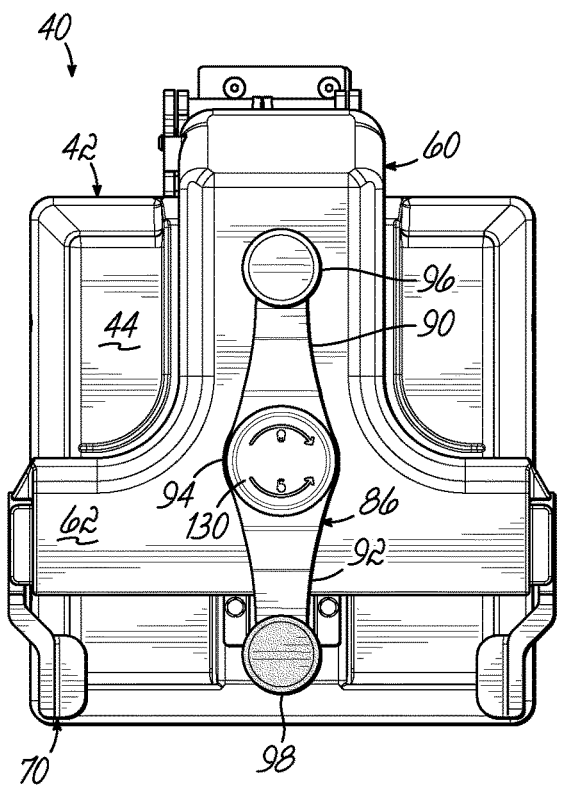
FIG. 4B is a top elevation view similar to FIG. 4A, showing the handle of the spindle in the predetermined stop orientation such that the shaft of the spindle is in a desired clamping position.
Figure 4C:
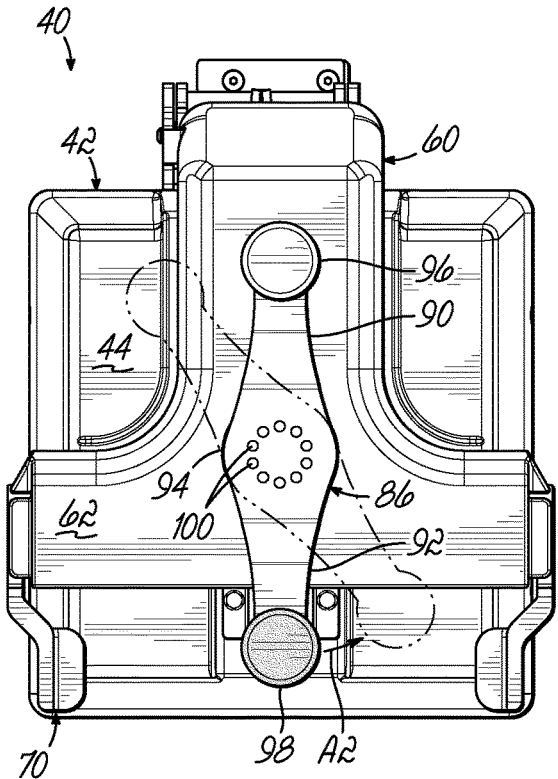
FIG. 4C is a top elevation view similar to FIG. 4B, showing the handle of the spindle detached from the shaft of the spindle and rotatably indexed relative thereto in the counterclockwise direction to increase the angular range of motion of the shaft beyond the original desired clamping orientation.
Figure 4D:
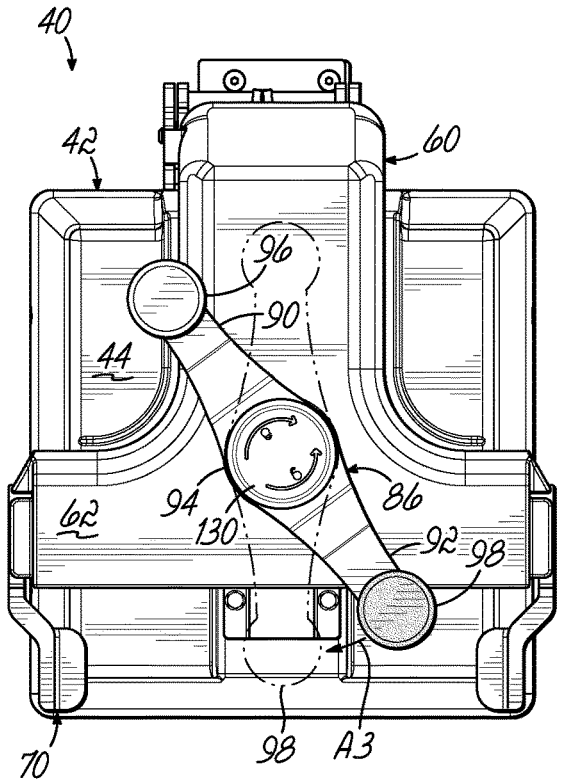
FIG. 4D is a top elevation view similar to FIG. 4C, showing the handle of the spindle selectively repositioned on the shaft of the spindle and rotated in the clockwise direction to the predetermined stop orientation to position the shaft of the spindle in an actual clamping orientation beyond the original desired clamping orientation, such that the cover may be firmly clamped in the closed position when the handle is in the predetermined stop orientation.

In this regard, and referring now to FIGS. 4A-4D, the handle 86 of the spindle 82 may initially be in a start orientation prior to clamping the cover 42 in the fully closed position, and may be rotated from the start orientation (e.g., in a clockwise direction) toward a predetermined stop orientation to position the shaft 84 of the spindle 82 in a desired clamping orientation to begin applying a clamping action on the cover 42, as indicated by the arrow A1 in FIG. 4A. When the handle 86 reaches the predetermined stop orientation shown in FIG. 4B such that the shaft 84 is in the desired clamping orientation, the cover 42 may be properly clamped in the fully closed position. Further rotation of the handle 86 (e.g., in the clockwise direction) beyond the predetermined stop orientation shown in FIG. 4B may be prevented by the interaction between the first hard stop 69 provided on the brace 62 and the second hard stop (not shown) provided on the handle 86.

In the embodiment shown, the predetermined stop orientation aligns the handle 86 of the spindle 82 generally longitudinally with the body 44 of the cover 42 and with the brace 62 of the auxiliary closure member 60, and also places the second knob 98 at or near the front of the cover 42 (e.g., proximate to the operator's normal position) and places the first knob 96 at or near the rear of the cover 42 (e.g., distal from the operator's normal position). Such longitudinal alignment of the handle 86 and placement of the first and second knobs 96, 98 may provide a visual indication of the clamped status of the cover 42 in the closed position, and/or assist the operator in rotating the handle 86 to the proper orientation for clamping the cover 42 in the closed position.

During the lifetime of the fryer 10, the actual clamping orientation of the shaft 84 of the spindle 82 for effectively clamping the cover 42 in the closed position may deviate or creep from the desired clamping orientation. For example, it may become desirable to rotate the shaft 84 beyond the original desired clamping orientation to an actual clamping orientation to sufficiently clamp the cover 42 in the closed position. This may result from one or more gaskets between the cover 42 and the frypot 12 degrading over time, such that rotating the shaft 84 to the original desired clamping orientation may become less effective to clamp the cover 42 in the closed position. However, the interaction between the first hard stop 69 provided on the brace 62 and the second hard stop (not shown) provided on the handle 86 may prevent further rotation of the handle 86 beyond the predetermined stop orientation and thus inhibit rotation of the shaft 84 beyond the original desired clamping orientation.

In one embodiment, the angular range of motion of the shaft 84 may be increased beyond the original desired clamping orientation by adjusting or resetting the orientation of the handle 86 relative to the shaft 84. For example, while the spindle 82 is positioned with the handle 86 in the predetermined stop orientation, the handle 86 may be detached from the shaft 84 and rotatably indexed relative thereto (e.g., in the counterclockwise direction), as indicated by the arrow A2 in FIG. 4C. In this regard, the cap 130 may be removed from the adjustment portion 94 of the handle 86 to allow access to the pair of fasteners 102. The pair of fasteners 102 may then be removed from the pair of threaded bores 106 of the shaft 84 and from the previously-selected pair of bores 100 of the adjustment portion 94 to decouple the handle 86 from the shaft 84, thereby allowing the handle 86 to be rotated or indexed independent from and relative to the shaft 84 from a first position to a second position, as indicated by the arrow A2. While adjusting the handle 86 to the second position, the pair of threaded bores 106 of the shaft 84 may be aligned with a newly-selected pair of bores 100 of the adjustment portion 94 and the pair of fasteners 102 may be inserted therethrough to recouple the handle 86 to the shaft 84. The second position may be selected such that further rotation of the handle 86 (e.g., in the clockwise direction) may be permitted and may be sufficient to position the shaft 84 in the actual clamping orientation when the handle 86 reaches the predetermined stop orientation, as indicated by the arrow A3 in FIG. 4D. In this regard, it will be appreciated that a greater number of mounting bores 100 provided in the adjustment portion 94 may allow for increased fine-tuning of the position of the handle 86 relative to the shaft 84 to achieve the desired clamping action when the handle 86 is in the predetermined stop orientation. Thus, rotation of the handle 86 to the predetermined stop orientation shown in FIG. 4B may resume properly clamping the cover 42 in the fully closed position.

After adjusting the position of the handle 86 relative to the shaft 84, the handle 86 may be rotated to the predetermined stop orientation to clamp the cover 42 in the fully closed position. The frypot 12 may then be pressurized and the seal between the cover 42 and the frypot 12 may be assessed for quality. If a stronger seal is desired, the position of the handle 86 relative to the shaft 84 may be further adjusted in the same manner set forth above, and the handle 86 may again be rotated to the predetermined stop orientation to clamp the cover 42 in the fully closed position. Further deviations of the actual clamping orientation of the shaft 84 for adequately clamping the cover 42 in the closed position from the desired clamping orientation throughout the continued lifetime of the fryer 10 may likewise be addressed by additional adjustments or re-settings of the orientation of the handle 86 relative to the shaft 84. In this regard, various incremental adjustments of the position of the handle 86 relative to the shaft 84 may be made based on various selections of pairs of the mounting bores 100 of the adjustment portion 94. Such continuing adjustments of the handle 86 relative to the shaft 84 may increase the useful life of any gasket(s) between the cover 42 and the frypot 12. For example, such adjustments may eliminate the need or desire to replace a partially degraded gasket in order to allow rotation of the handle 86 to the predetermined stop orientation to resume properly clamping the cover 42 in the fully closed position, since the same result can be achieved by the adjustments of the handle 86.

While not shown, the combination pressure and open fryer 10 may include a secondary stop feature to further assist in preventing the cover 42 from being inadvertently moved away from the fully closed position. For example, the locking mechanism 70 may include a release bar (not shown) extending between front ends of the hooks 72, and a generally central stop tab (not shown) may extend rearwardly from the release handle for selective interaction with one of the lever portions 90, 92 of the handle 86 of the spindle 82. In this regard, a bottom surface of one of the lever portions 90, 92, such as the first lever portion 90, may be configured to abut a top surface of such a stop tab when the cover 42 is in the fully closed position, thereby inhibiting upward movement of the release bar and thus preventing the hooks 72 from being rotated out of engagement with the posts or other mechanical features fixed relative to the frypot 12 until the handle 86 of the spindle 82 has first been rotated away from the stop tab. The interaction of the stop tab with the handle 86 may also provide a visual indication to the operator that the handle 86 must be rotated before attempting to manipulate the release bar to disengage the hooks 72 from the posts when opening the frypot 12.

In another embodiment, the intermediate position of the cover 42 may be eliminated. More particularly, the cover 42 may be configured to be "self-opening" so as to automatically move from the fully closed position to the open position when the clamping action is removed from the cover 42 without first resting in the intermediate or partially closed position. For example, the locking mechanism 70 may be spring-loaded to bias the hooks 72 out of engagement with the posts or other mechanical features fixed relative to the frypot 12. Such biasing of the hooks 72 may be overcome by rotating the spindle 82 to apply the clamping action on the cover 42 to secure the cover 42 in the fully closed position and allow the hooks 72 to remain engaged with the posts or other mechanical features fixed relative to the frypot 12. Rotating the spindle 82 in the opposite direction to remove the clamping action from the cover 42 may allow the biasing of the hooks 72 to rotate the hooks 72 out of engagement with the posts or other mechanical features fixed relative to the frypot 12, thereby allowing the cover 42 to automatically return to the open position without requiring the operator to manually disengage from the hooks 72 from the posts or other mechanical features fixed relative to the frypot 12. These features of the closure assembly 40 may be repeated on each frypot where a cover is to be provided for enabling pressure and open frying, which as set forth above may be some or all of the frypots at the fryer 10 in different embodiments thereof.

Figure 5:
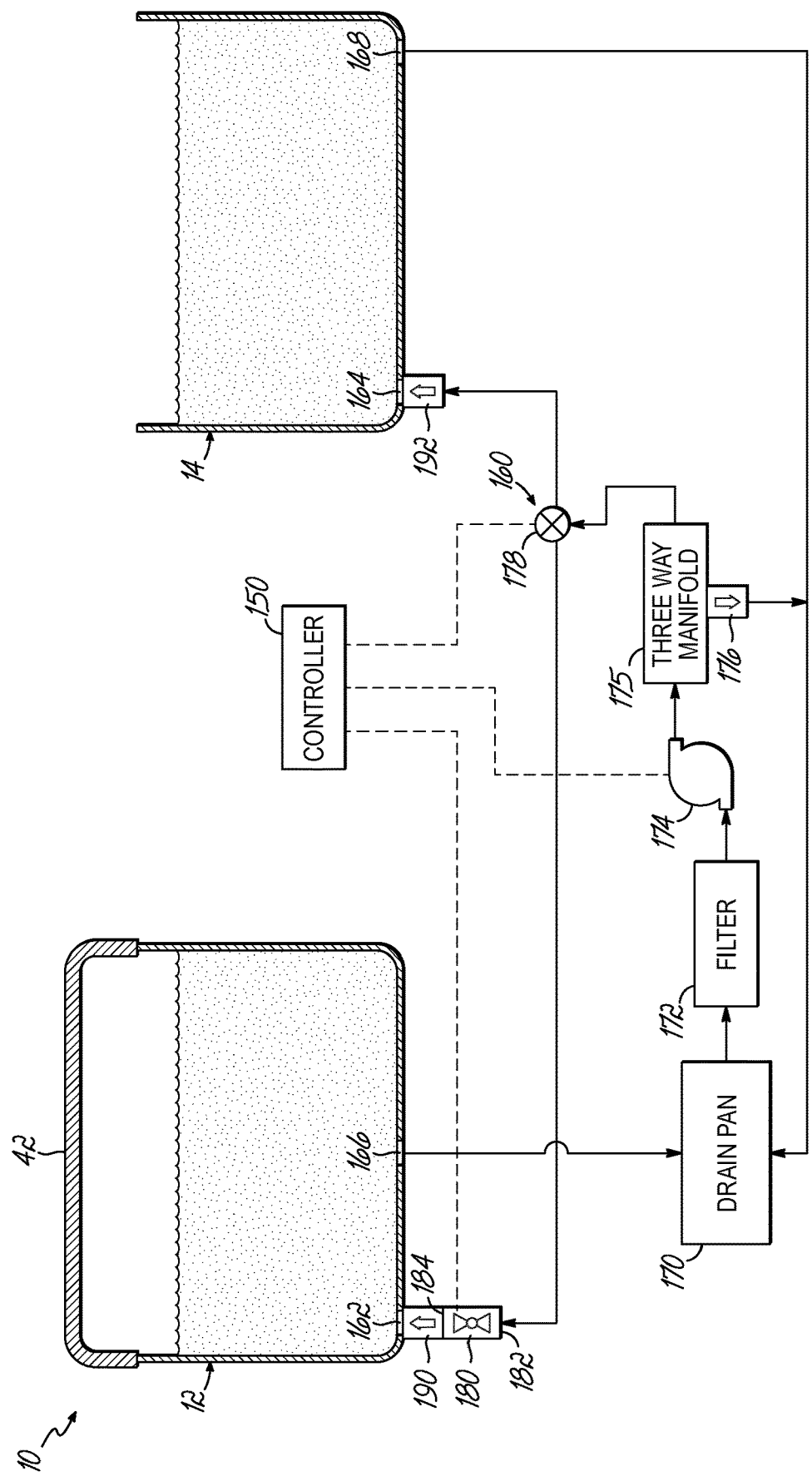
FIG. 5 is a diagrammatic view of the combination pressure and open fryer of FIG. 1 depicting a selectively closeable frypot, an open frypot, a common filtration system, and a controller.

Referring now to FIG. 5, the combination pressure and open frying apparatus 10 may further include a common filtration system 160. In this regard, the selectively closeable and open frypots 12, 14 may include first and second cooking medium inlets 162, 164, respectively, and first and second cooking medium outlets 166, 168, respectively. The illustrated filtration system 160 includes a drain pan 170 downstream from the first and second cooking medium outlets 166, 168, a cooking medium filter assembly 172 downstream from the drain pan 170, a pump 174 downstream from the cooking medium filter assembly 172, a multi-port manifold such as a 3-way manifold 175 downstream from the pump 174, a manifold check valve 176 downstream from one outlet end of the 3-way manifold 175, a selector valve 178 downstream from the other outlet end of the 3-way manifold 175 and upstream from both the first and second cooking medium inlets 162, 164, a failsafe valve such as a ball valve 180 downstream from the selector valve 178 and upstream from the first cooking medium inlet 162 and having an inlet end 182 and an outlet end 184, a first check valve 190 between the ball valve 180 and the first cooking medium inlet 162, and a second check valve 192 between the selector valve 178 and the second cooking medium inlet 164.

While not shown, one or more drain valves may be positioned downstream from the first and second cooking medium outlets 166, 168 and upstream from the drain pan 170 for selectively placing the first and/or second cooking medium outlets 166, 168 into and out of fluid communication with the drain pan 170 to allow the cooking medium to be drained into the drain pan 170 from the selectively closeable and/or open frypot 12, 14 such that the drain pan 170 may collect the drained cooking medium for either disposal or filtering and reuse.

In this regard, the filter assembly 172 may include a housing configured to accept a filter for filtering the cooking medium, and the pump 174 may be configured to draw cooking medium out of the drain pan 170 and through the filter assembly 172. The pump 174 may be further configured to direct the filtered cooking medium through the 3-way manifold 175. While the illustrated pump 174 is positioned downstream from the filter assembly 172, it will be appreciated that the pump 174 may alternatively be positioned upstream from the filter assembly 172 (e.g., between the drain pan 170 and the filter assembly 172).

As shown, the manifold check valve 176 is positioned downstream from one outlet end of the 3-way manifold 175 and the selector valve 178 is positioned downstream from the other outlet end of the 3-way manifold 175. The manifold check valve 176 may be configured to limit pressure in the filtration system 160 and to recirculate cooking medium back into the drain pan 170 in the event that the selector valve 178 and/or ball valve 180 fail to operate or become blocked.

In the embodiment shown, the selector valve 178 is configured to selectively place the pump 174 into and out of fluid communication with the second cooking medium inlet 164 and with the inlet end 182 of the ball valve 180, and the ball valve 180 is configured to selectively place the first cooking medium inlet 162 into and out of fluid communication with the inlet end 182 of the ball valve 180. The check valves 190, 192 may be configured prevent the cooking medium from back flowing toward the selector valve 178 from the respective cooking medium inlets 162, 164. Thus, the filtered cooking medium may be selectively directed from the pump 174 to the second cooking medium inlet 164 and into the open frypot 14 when the selector valve 178 is in a first open state, and may be selectively directed from the pump 174 to the first cooking medium inlet 162 and into the selectively closeable frypot 12 when the selector valve 178 is in a second open state and the ball valve 180 is in a corresponding open state.

To that end, the controller 150 may be in operative communication with both the selector valve 178 and the ball valve 180, as well as with the pump 174 and various other components of the combination pressure and open fryer 10, such as the control panels 18, 20, heating elements and/or temperature sensors (not shown). The controller 150 may be configured to send a first "open" signal to the selector valve 178 to selectively place the pump 174 into fluid communication with the second cooking medium inlet 164 for supplying filtered cooking medium to the open frypot 14, and may be configured to send a first "close" signal to the selector valve 178 to selectively place the pump 174 out of fluid communication with the second cooking medium inlet 164 to prevent supplying filtered cooking medium to the open frypot 14. Likewise, the controller 150 may be configured to send contemporaneous second "open" signals to the selector valve 178 and the ball valve 180 to selectively place the pump 174 into fluid communication with the first cooking medium inlet 162 for supplying filtered cooking medium to the selectively closeable frypot 12, and may be configured to send contemporaneous second "close" signals to the selector valve 178 and the ball valve 180 to selectively place the pump 174 out of fluid communication with the first cooking medium inlet 162 to prevent supplying filtered cooking medium to the selectively closeable frypot 12.

In one embodiment, the ball valve 180 may prevent cooking medium from entering the selectively closeable frypot 12 during a failure of the selector valve 178. For example, the selector valve 178 may be configured to place the pump 174 out of fluid communication with the inlet end 182 of the ball valve 180 while a pressure cooking cycle is being performed within the selectively closeable frypot 12. As the pressure cooking cycle is being performed, an oil filtering cycle may be performed within the open frypot 14. In some cases, the selector valve 178 may fail while the pressure cooking and oil filtering cycles are taking place in the respective frypots 12, 14, thereby inadvertently placing the pump 174 in fluid communication with the inlet end 182 of the ball valve 180 and allowing cooking medium to be directed thereto. The ball valve 180, by remaining in a closed state, may prevent such cooking medium from entering the first cooking medium inlet 162 of the selectively closeable frypot 12 which could otherwise cause the cooking medium to escape through a steam release of the selectively closeable frypot 12, for example. The resulting buildup of cooking medium in the filtration system 160 may cause a dead head which could potentially damage the pump 174. In one embodiment, the manifold check valve 176 may be configured to detect such dead head and respond by redirecting the cooking medium back to the drain pan 170 to avoid damaging the pump 174. For example, the manifold check valve 176 may have a pressure rating of 50 psi.

These valves and structures in the common filtration system 160 described above may be duplicated or reconfigured such that any frypot operating as a pressure frying platform is prevented from filtration recirculation of incoming oil flow by diverting any such flow to other frypots operating open (without pressurization) or back to the filter pan, in other embodiments of the fryer 10 where more or all of the frypots are closeable and operable as pressure frying platforms. One skilled in the art will readily understand that the provision of selector valve(s) and failsafe valve(s) is configured to prevent unwanted oil discharges and/or pump damage.

Thus, the combination pressure and open fryer 10 may be capable of operating with improved safety and reliability as compared to prior art fryers, particularly with respect to pressure cooking operations performed within the selectively closeable frypot 12. These advantages of improved safety and reliability are achieved regardless of how many of (including potentially all of) the frypots 12, 14 are provided with a closure assembly 40 to operate as selectively closeable frypots in the various embodiments of fryer 10.

The terminology used herein is for the purpose of describing particular embodiments only and is not intended to be limiting of the embodiments of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes," "having," "has," "with," "comprised of," or variants thereof are used in either the detailed description or the claims, such terms are intended to be inclusive in a manner similar to the term "comprising."

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the Applicant's general inventive concept.

What is claimed is:

1. A pressure frying apparatus, comprising:
   at least one selectively closeable frypot configured to cook food product, the at least one selectively closeable frypot including an access opening for food product;
   a cover configured to selectively close the access opening and seal the at least one selectively closeable frypot, the cover being movable from a closed position to an open position;
   a clamping mechanism including at least one clamping surface configured to urge the cover toward the closed position and a spindle rotatably coupled to the cover and configured to move the at least one clamping surface from an unclamped position to a clamped position that clamps the cover in the closed position, the spindle including a shaft and a handle selectively mounted to the shaft, the handle being configured to be selectively mounted to the shaft in a plurality of positions relative to the shaft,
   wherein the at least one selectively closeable frypot is configured to operate as a pressure frying platform when the cover is clamped in the closed position and the at least one selectively closeable frypot is configured to operate as an open flying platform when the cover is in the open position.

2. The pressure frying apparatus of claim 1, wherein the handle includes first and second lever portions extending away from each other.

3. The pressure frying apparatus of claim 2, wherein the handle includes an adjustment portion positioned between the first and second lever portions.

4. The pressure frying apparatus of claim 3, wherein the adjustment portion includes a plurality of mounting bores configured to selectively receive one or more fasteners for selectively mounting the handle to the shaft.

5. The pressure frying apparatus of claim 4, wherein the mounting bores are circumferentially arranged on the adjustment portion.

6. The pressure frying apparatus of claim 4, wherein the one or more fasteners includes a pair of fasteners, and wherein the shaft includes a pair of bores configured for alignment with a selected pair of the mounting bores of the adjustment portion and to receive the pair of fasteners for selectively mounting the handle to the shaft.

7. The pressure frying apparatus of claim 1, further comprising:
   a first cooking medium inlet included in the at least one selectively closeable frypot;
   at least one second frypot configured to cook food product, the at least one second frypot configured to operate in at least one operating state as an open frying platform and including a second cooking medium inlet; and
   a common filtration system that is operatively connected to the at least one second frypot and the at least one selectively closeable frypot, the common filtration system being configured to filter cooking medium from each of the at least one second frypot and the at least one selectively closeable frypot and including:
      a pump;
      a selector valve that is in-line with and downstream from the pump and upstream from the first and second cooking medium inlets;
      a failsafe valve that is in-line with and downstream from the selector valve and upstream from the first cooking medium inlet, the failsafe valve including an inlet end and an outlet end,
   wherein the selector valve is configured to selectively place the pump into and out of fluid communication with the second cooking medium inlet and the inlet end of the failsafe valve, and wherein the failsafe valve is configured to selectively place the first cooking medium inlet into and out of fluid communication with the inlet end of the failsafe valve to prevent flow of cooking medium into the at least one selectively closeable frypot when the at least one selectively closeable frypot is pressurized.

8. A method of adjusting a spindle rotatably coupled to a cover of a selectively closeable frypot configured to cook food product and configured to move a clamping surface from an unclamped position to a clamped position that clamps the cover in a closed position, the spindle including a shaft and a handle selectively mounted to the shaft in a first position relative to the shaft, the method comprising:
   selectively mounting the handle to the shaft in a second position relative to the shaft different from the first position.

9. The method of claim 8, further comprising:
   selectively removing the handle from the shaft prior to selectively mounting the handle to the shaft in the second position.

10. The method of claim 9, wherein selectively removing the handle includes removing fasteners from a first set of mounting bores provided in an adjustment portion of the handle.

11. The method of claim 10, wherein selectively mounting the handle to the shaft in the second position includes positioning the fasteners in a second set of mounting bores provided in the adjustment portion different from the first set of mounting bores.

12. The pressure frying apparatus of claim 1, further comprising:

a locking mechanism operatively connected to the cover and configured to selectively move to an engaged position to secure the cover in the closed position, the locking mechanism biased away from the engaged position when the clamping mechanism moves to the unclamped position such that the cover is configured to be self-opening and automatically moves to the open position when the clamping mechanism is unclamped.

* * * * *